(12) United States Patent
Schmidt et al.

(10) Patent No.: US 11,459,015 B2
(45) Date of Patent: Oct. 4, 2022

(54) ELECTRICALLY ADJUSTABLE STEERING COLUMN FOR A MOTOR VEHICLE

(71) Applicants: thyssenkrupp Presta AG, Eschen (LI); thyssenkrupp AG, Essen (DE)

(72) Inventors: René Marco Schmidt, Lienz (CH); Kevin Templin, Fishers, IN (US); Helmut Kirmsse, Schaan (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 63 days.

(21) Appl. No.: 16/765,516

(22) PCT Filed: Dec. 13, 2018

(86) PCT No.: PCT/EP2018/084768
§ 371 (c)(1),
(2) Date: May 20, 2020

(87) PCT Pub. No.: WO2019/115696
PCT Pub. Date: Jun. 20, 2019

(65) Prior Publication Data
US 2020/0307670 A1      Oct. 1, 2020

(30) Foreign Application Priority Data
Dec. 15, 2017   (DE) ............... 10 2017 222 976.4

(51) Int. Cl.
*B62D 1/181* (2006.01)
*B62D 1/185* (2006.01)
*B62D 1/187* (2006.01)

(52) U.S. Cl.
CPC ............ *B62D 1/181* (2013.01); *B62D 1/185* (2013.01); *B62D 1/187* (2013.01)

(58) Field of Classification Search
CPC ..................................................... B62D 1/181
See application file for complete search history.

(56) References Cited

U.S. PATENT DOCUMENTS

| 4,691,587 A | 9/1987 | Farrand |
| 5,590,565 A | 1/1997 | Palfenier |
| (Continued) | | |

FOREIGN PATENT DOCUMENTS

| CN | 105339236 A | 2/2016 |
| CN | 208376861 U * | 1/2019 |
| (Continued) | | |

OTHER PUBLICATIONS

English Translation of International Search Report issued in PCT/EP2018/084768, dated Apr. 2, 2019.

*Primary Examiner* — Nicole T Verley
(74) *Attorney, Agent, or Firm* — thyssenkrupp North America, LLC (57) ABSTRACT

An adjustable steering column may include a casing unit that rotatably supports a steering spindle part and that is mounted in a guide box in an axially sliding manner and can be axially adjusted by a motor drive. The motor drive has an electric motor secured to the guide box and drives an axially aligned threaded spindle that is mounted on the guide box in a rotatable and axially fixed manner and that engages into an adjustment nut. The adjustment nut is connected to the casing unit, is axially movable together with the casing unit relative to the guide box, and is mounted in a connection part secured to the casing unit to transmit axial forces to the casing unit. The adjustment nut may be guided between opposing inner guide surfaces of the connection part with clearance such that the adjustment nut is movable within the guide surfaces on a plane orthogonal to an axial direction.

10 Claims, 8 Drawing Sheets

(56) References Cited

U.S. PATENT DOCUMENTS

| | | | |
|---|---|---|---|
| 9,616,914 B2 | 4/2017 | Stinebring | |
| 10,385,930 B2 * | 8/2019 | Magnus | F16D 28/00 |
| 10,421,475 B2 * | 9/2019 | Derocher | F16H 25/205 |
| 10,421,476 B2 * | 9/2019 | Rouleau | B62D 1/184 |
| 2008/0019455 A1 | 1/2008 | Kim | |
| 2011/0314954 A1 | 12/2011 | Matsuno | |
| 2012/0247259 A1 | 10/2012 | Mizuno | |
| 2014/0260728 A1 | 9/2014 | Holm | |
| 2015/0375767 A1 | 12/2015 | Agbor | |
| 2016/0046318 A1 | 2/2016 | Stinebring | |
| 2017/0361863 A1 * | 12/2017 | Rouleau | B62D 1/195 |
| 2017/0363189 A1 * | 12/2017 | Nunez | F16H 25/20 |
| 2018/0244300 A1 | 8/2018 | Abou Alam | |
| 2021/0197882 A1 * | 7/2021 | Bayer | B62D 1/185 |

FOREIGN PATENT DOCUMENTS

| | | | | |
|---|---|---|---|---|
| CN | 112384429 A * | 2/2021 | | B62D 1/181 |
| DE | 10310492 A1 | 9/2004 | | |
| DE | 10 2015 216 715 A | 3/2017 | | |
| DE | 102018219264 A1 * | 5/2020 | | B62D 1/181 |
| DE | 102020204473 A1 * | 10/2021 | | B62D 1/181 |
| EP | 1 737 720 B | 6/2009 | | |
| EP | 3299253 A1 * | 3/2018 | | B62D 1/181 |
| FR | 2881097 A1 * | 7/2006 | | B62D 1/181 |
| WO | WO-2008072711 A1 * | 6/2008 | | B62D 1/181 |
| WO | WO-2015144527 A1 * | 10/2015 | | B62D 1/181 |
| WO | 2017/139627 A | 8/2017 | | |
| WO | WO-2019158424 A1 * | 8/2019 | | B62D 1/181 |
| WO | WO-2019228355 A1 * | 12/2019 | | B62D 1/181 |
| WO | WO-2020078877 A1 * | 4/2020 | | B62D 1/181 |

* cited by examiner

ELECTRICALLY ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2018/084768, filed Dec. 13, 2018, which claims priority to German Patent Application No. DE 10 2017 222 976.4, filed Dec. 15, 2017, the entire contents of both of which are incorporated herein by reference.

FIELD

The present disclosure generally relates to steering columns, including adjustable steering columns for motor vehicles.

BACKGROUND

An electrically adjustable steering column is known from DE 10 2015 216 715 A1. In order to avoid canting of the adjustment nut, said adjustment nut in the known steering column is mounted so as to be pivotable about an axis which is orthogonal to the rotation axis of the threaded spindle. Other embodiments of pivotably mounting the adjustment nut are known from WO 2017 139 627 A1. However, it has been demonstrated that the pivotable mounting of the adjustment nut alone is not sufficient for preventing jamming of the adjustment nut in all operational states that arise in practice, in particular when the components of the motorized drive have comparatively large production tolerances.

Thus a need exists for an adjustable steering column having a motorized drive in which the adjustment is possible with a minimal input of force, or input of torque, respectively, and with minimal requirements in terms of the component tolerances.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an adjustable steering column for a motor vehicle. In some examples, the adjustable steering column includes a casing unit that is specified for rotatably mounting a spindle part of a steering spindle and that is mounted so as to be axially sliding and/or pivotable in a holding installation and by means of a motorized drive is adjustable axially and/or pivotably. The motorized drive may have an electric motor that is fastened to the holding installation and that drives a threaded spindle that is aligned axially along an axial direction and is mounted on the holding installation so as to be rotatable and mounted so as to be axially non-displaceable. The threaded spindle may engage in an adjustment nut that is connected to the casing unit and conjointly with the latter is displaceable axially in relation to the holding installation. Further, the adjustment nut for transmitting axial forces from the adjustment nut to the casing unit may be mounted in a fastening part that is fastened to the casing unit.

The solution according to the invention provides that the adjustment nut is guided with clearance between two opposite inner guiding faces of the connection part such that said adjustment nut within the guiding faces is displaceable in a plane orthogonal to the axial direction. On account of the displacement capability of the adjustment nut in relation to the connection part according to the invention, the adjustment nut can in each case adapt in an optimal manner to the orientation and the movement of the threaded spindle, and to the deflections of said threaded spindle from the rotation axis. Deflections of this type can be created in a threaded spindle which is not precisely aligned in a straight manner. Long threaded spindles in which the deflections mentioned may be significant are required for large adjustment paths.

In the steering column according to the invention the holding installation can be formed by a guide box in which the casing unit is mounted so as to slide in an axial manner, or by a holding part which pivotably mounts the casing unit. However, it is also conceivable and possible for a combination to be formed in which the guide box as a boxed swing arm is pivotably mounted on the holding part and mounts the casing unit so as to slide in an axial manner.

When reference hereunder is made to simply a guide box, all mentioned variants are included therein.

In a first and a second preferred embodiment of the invention the adjustment nut in a first displacement direction orthogonal to the axial direction is displaceable between a first inner guiding face and a second inner guiding face, opposite the latter, of the connection part. On account of this measure, potentially arising deviations in the orientation of the threaded spindle can be compensated by displacing the adjustment nut.

In a further advantageous design embodiment of the first exemplary embodiment, at least one spring element is in each case disposed between the first inner guiding face of the connection part and a neighboring first outer surface of the adjustment nut, as well as between the second inner guiding face of the connection part and a neighboring second outer surface of the adjustment nut. On account of the spring element, the adjustment nut can be centered between the inner guiding faces of the connection part. Moreover, the spring elements prevent rattling noises which could potentially arise when the adjustment nut as a result of vibrations arising in the operation while driving impacts on the inner guiding faces of the connection part.

In a third preferred embodiment it is provided that the adjustment nut in a second displacement direction orthogonal to the axial direction and to the first displacement direction is displaceable between a third inner guiding face and a fourth inner guiding face, opposite the latter, of the connection part. This measure has the advantage that the adjustment nut is displaceable not only in the first displacement direction or the second displacement direction, but also in each direction which is achievable on account of a combination of the two displacements and which lies in a plane orthogonal to the axial direction. Malfunction-free sliding of the adjustment nut on the rotating threaded spindle is in this way guaranteed even under extremely unfavorable operating conditions.

It is also advantageous in the third embodiment when at least one spring element is in each case disposed between the third inner guiding face of the connection part and a neighboring third outer surface of the adjustment nut, as well as between the fourth inner guiding face of the connection part and a neighboring fourth outer surface of the adjustment nut.

An advantageous refinement of the first exemplary embodiment provides that the adjustment nut is mounted on the connection part so as to be rotatable about an axis orthogonal to the axial direction. In particular when the axis orthogonal to the axial direction is congruent with the first displacement direction, an assembly is obtained in which deviations in the mutual relative orientation of the components are capable of being compensated to a greater extent than in an assembly which provides only tilting of the adjustment nut and no lateral displacement of the latter.

A fourth advantageous embodiment of the invention provides that the adjustment nut in the axial direction is disposed so as to be displaceable between a fifth inner guiding face and a sixth inner guiding face, opposite the latter, of the connection part, wherein at least one spring element is in each case disposed between the fifth inner guiding face of the connection part and a neighboring fifth outer surface of the adjustment nut, as well as between the sixth inner guiding face of the connection part and a neighboring sixth outer surface of the adjustment nut. On account of the additional displacement capability in the axial direction in conjunction with one or both displacement paths in the first and/or the second displacement direction, tilting of the adjustment nut is enabled without the latter having to be rotatably mounted. Moreover, the tilting can take place in any arbitrary direction. Conjointly with the displacement capability of the adjustment nut transversely to the axial direction, any deviations in the orientation of the adjustment nut relative to the threaded spindle can be compensated by the mounting of the adjustment nut according to the invention.

Advantageous embodiments of the spring elements provide that said spring elements are designed as a Belleville spring, a plate spring, helical spring, or a leaf spring.

An alternative advantageous embodiment provides that the spring elements can be composed of elastomer or rubber.

It can however furthermore be provided that the adjustment nut is mounted in the connection part so as to be rotatable about a displacement direction which is aligned so as to be perpendicular to the axial direction. On account thereof, even further compensation of tolerances is possible.

In the basic design of the steering column it can be specified by way of perspective considerations of tolerances and/or in experiments which one of the embodiments is to be used for the respective type of steering column.

A first exemplary embodiment of the invention is illustrated in FIGS. 1 to 5.

Figure 1:
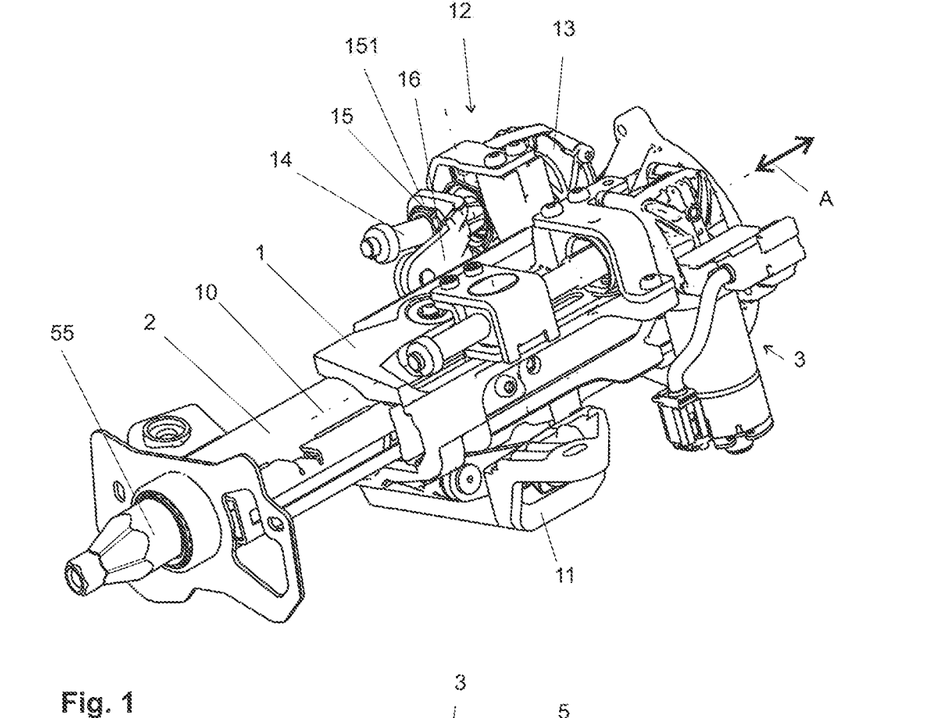
FIG. 1 is a perspective view of an example adjustable steering column.

The adjustable steering column illustrated in FIG. 1 possesses a guide box 1 in which the casing unit 2 is mounted so as to be longitudinally displaceable in the axial direction A. The casing unit 2 is provided for the rotatable mounting of a steering spindle 55 which has two spindle parts which are capable of telescoping into one another. One spindle part herein is axially non-displaceable, and the other spindle part is axially displaceable. The axially displaceable spindle part is rotatably mounted in the casing unit 2 and conjointly with the casing 2 is displaced in the axial direction A when the casing unit 2 itself is axially displaced.

Figure 2:
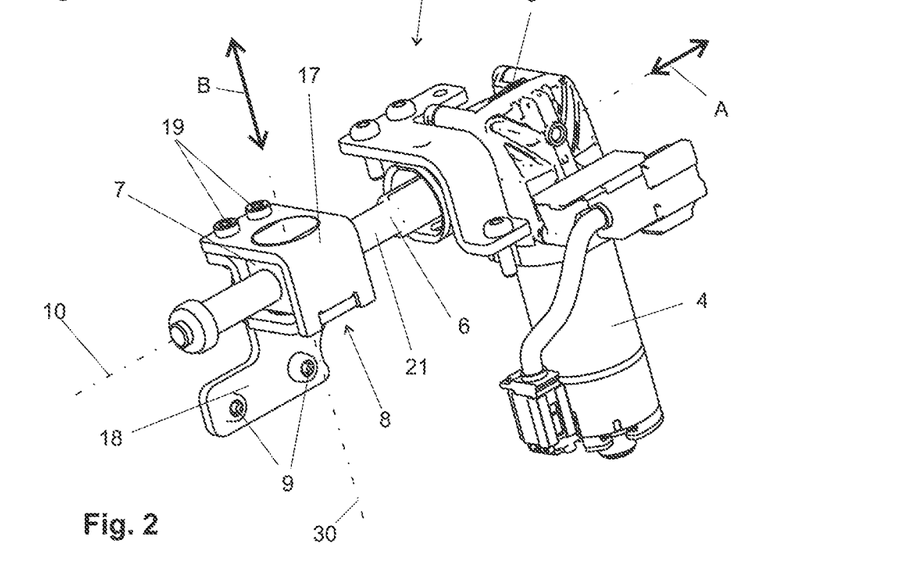
FIG. 2 is a perspective view in an axial direction of a motorized drive for the longitudinal adjustment of the steering column of FIG. 1.

A motorized drive 3 which is illustrated in FIG. 2 is provided for the axial adjustment of the steering column. The motorized drive 3 has an electric motor 4, a gearbox 5, a threaded spindle 6 having an external thread 21, an adjustment nut 7, and a connection part 8 which by means of fastening screws 9 is fastened to the casing unit 2. The electric motor 4, the gearbox 5, and the threaded spindle 6 are fastened to the guide box 1. When the electric motor 4 is activated, said electric motor 4 by way of the gearbox 5 rotates the threaded spindle 6 about the rotation axis 10, the latter defining the axial direction A. The adjustment nut 7 sitting on the threaded spindle 6 herein is displaced in the axial direction A to the front or to the rear, depending on the rotating direction of the electric motor 4. The adjustment nut 7 is mounted in the connection part 8. The connection part 8 is therefore entrained in a displacement of the adjustment nut 7 in the axial direction A, and herein displaces in the axial direction A the casing unit 2 which by way of the connection screws 9 is fixedly connected to the connection part 8.

The guide box 1 is pivotably mounted on a holding part 11 which is fixedly connected to the body of the motor vehicle such that said holding part 11 is capable of tilting upward or downward. The steering wheel (not shown) can in this way be adjusted upward or downward. A height adjustment drive 12 which is constructed in a manner similar to the motorized drive 3 is provided for the height adjustment. The height adjustment drive 12 also possesses an electric motor (not shown), a gearbox 13, and a threaded spindle 14 on which an adjustment nut 15 is disposed. The adjustment nut 15 by way of a second connection part 151 is connected to a pivot arm 16 which causes the pivoting of the guide box 1 in relation to the holding part 11. The second connection part 151 can be configured in the same manner as the connection part 8 described in detail below and can represent the same functions when interacting with the adjustment nut 15.

Figure 3:
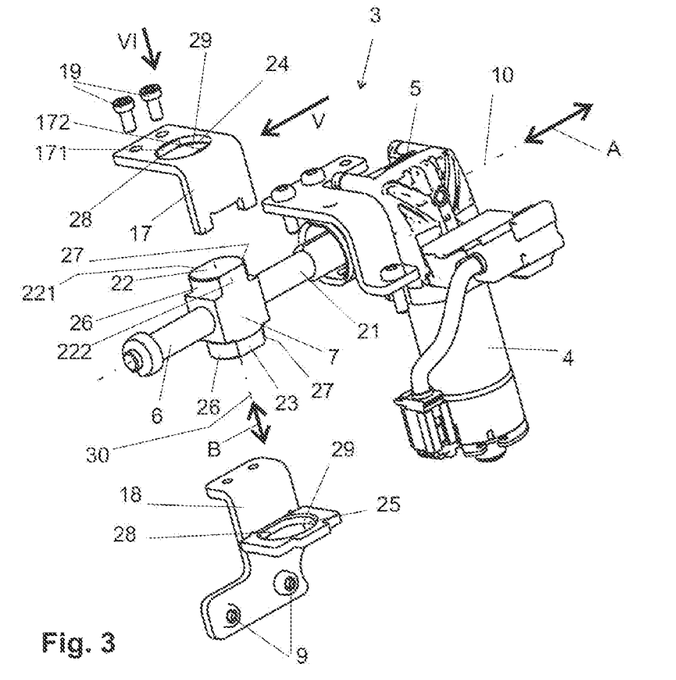
FIG. 3 is a perspective view of a motorized drive according to FIG. 2, having a disassembled connection part.

As can best be seen in FIGS. 2 and 3, the connection part 8 in the example comprises two punched sheet-metal parts 17, 18 which are screwed to one another by means of connection screws 19.

The adjustment nut 7 has the basic shape of a cube which is penetrated by a threaded bore 20. The threaded spindle 6 is provided with an external thread 21 which is screwed into the threaded bore 20 of the adjustment nut 7. The adjustment nut 7 therefore moves in the axial direction A when the threaded spindle 6 is rotated by way of the electric motor 4 and the gearbox 5. The adjustment nut 7 on two opposite sides is furthermore provided in each case with a protrusion 22, 23. The protrusion 22 is received in a recess 24 of the sheet-metal part 17 and the protrusion 23 is received in a recess 25 of the sheet-metal part 18 such that the adjustment nut 7 is mounted in the connection part 8. The protrusions 22, 23, which may also be referred to as pins, are designed so as to be in the shape of segments of circles, at least in the lateral regions 26, 27 of said protrusions 22, 23 which are substantially aligned in the axial direction A. The protrusions 22, 23 by way of the segment-shaped lateral regions 26, 27 lie on correspondingly molded segment-shaped inner faces 28, 29 of the recesses 24, 25. On account of the contact between the segment-shaped lateral region 26 and the segment-shaped inner face 28, or between the segment-shaped lateral region 27 and the segment-shaped inner face 29, respectively, the adjustment nut 7 can transmit displacement forces in the axial direction A to the connection part 8. Since the connection part 8 by means of connection screws 9 is fixedly connected to the casing unit 2, the displacement forces in the axial direction A are also transmitted to the casing unit 2 such that a displacement of the casing unit 2 in the axial direction A in relation to the guide box 1 can be caused in the event of a displacement of the adjustment nut 7 on the threaded spindle 6. As is illustrated in the example, the flat sides 221 and 222 are held in guiding sides 171 and 172 such that a rotation of the adjustment nut 7 about the axis 30 in the connection part 8 is restricted or even prevented.

However, it is possible and conceivable for the guiding sides 171 and 172 to be omitted and for the recesses 24 and 25 to be configured circular such that the adjustment nut 7 as a consequence of the segment-shaped design embodiment of the lateral regions 26, 27 of the protrusions 22, 23 of said adjustment nut 7, in conjunction with the inner faces 28, 29 of the recesses 24, 25 of the connection part 8, permits a rotation about an axis 30 which is aligned so as to be orthogonal to the axial direction A, said rotation being at least about a small angle. On account thereof, a further reduction in terms of jamming of the adjustment nut 7 as a result of a poorly aligned rotation axis 10 of the threaded spindle 6 can be achieved.

Such a malposition which can lead to jamming of the adjustment nut 7 can arise on account of production-related tolerances or by the deformation of participating components as a result of forces or torques acting on the latter in the operation while driving the vehicle.

Figure 4:
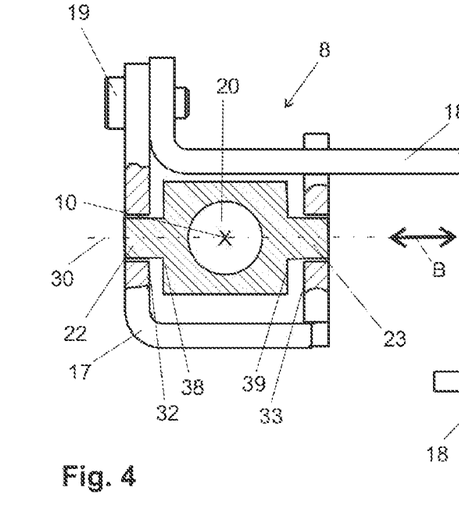
FIG. 4 is a partial sectional plan view from a direction V in FIG. 3 of an example connection part, which has an adjustment nut which is mounted so as to be tiltable in said connection part.

As can best be seen in FIG. 4, the adjustment nut 7 is guided with a clearance between the opposite sheet-metal parts 7 and 18 of the connection part 8 along the protrusions 22 and 23 in the inner faces 18, 29 such that said adjustment nut 7 within the connection part 8 is displaceable in a plane orthogonal to the axial direction A.

Figure 5:
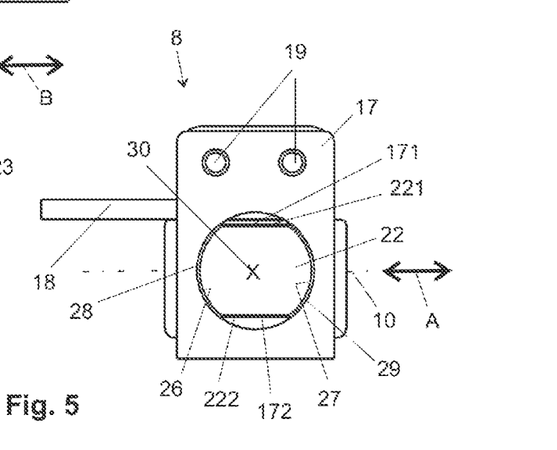
FIG. 5 is a plan view from a direction VI in FIG. 3 of the connection part of FIG. 5.

FIGS. 4 and 5 show a first exemplary embodiment in which the adjustment nut 7 in a first displacement direction B orthogonal to the axial direction A is displaceable between a first inner guiding face 32 and a second inner guiding face 33, opposite the latter, of the connection part 8.

Figure 6:
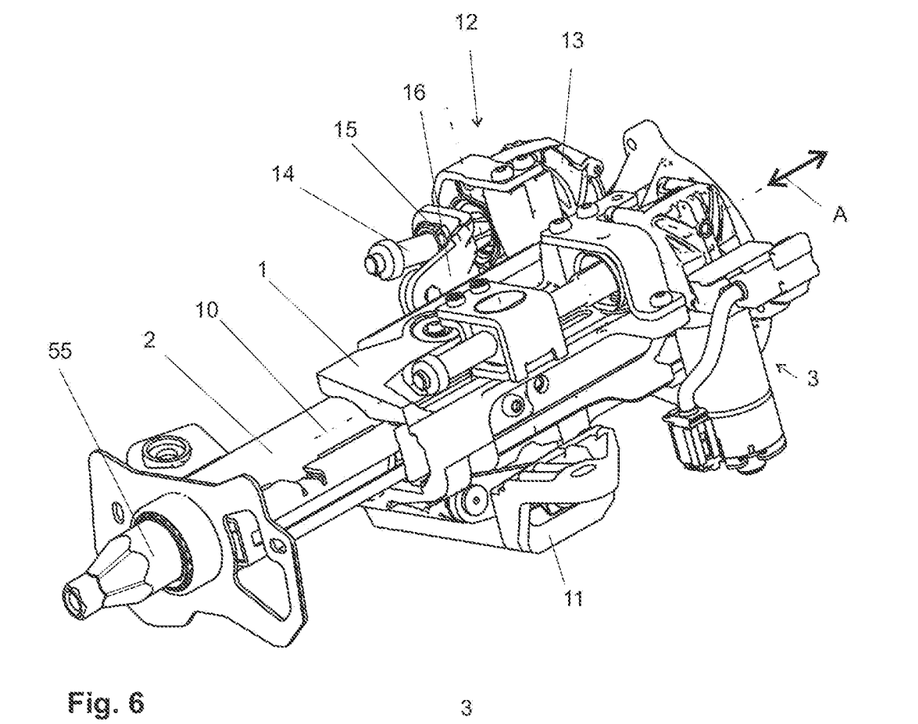
FIG. 6 is a perspective view of another example adjustable steering column.
Figure 7:
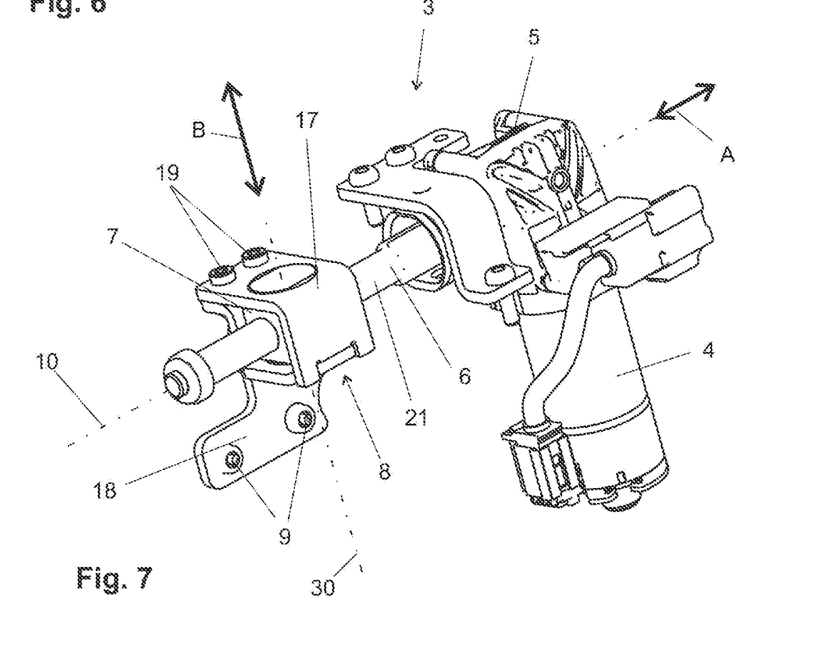
FIG. 7 is a perspective view in an axial direction of a motorized drive for longitudinal adjustment of the steering column corresponding to the example depicted in FIG. 6.
Figure 8:
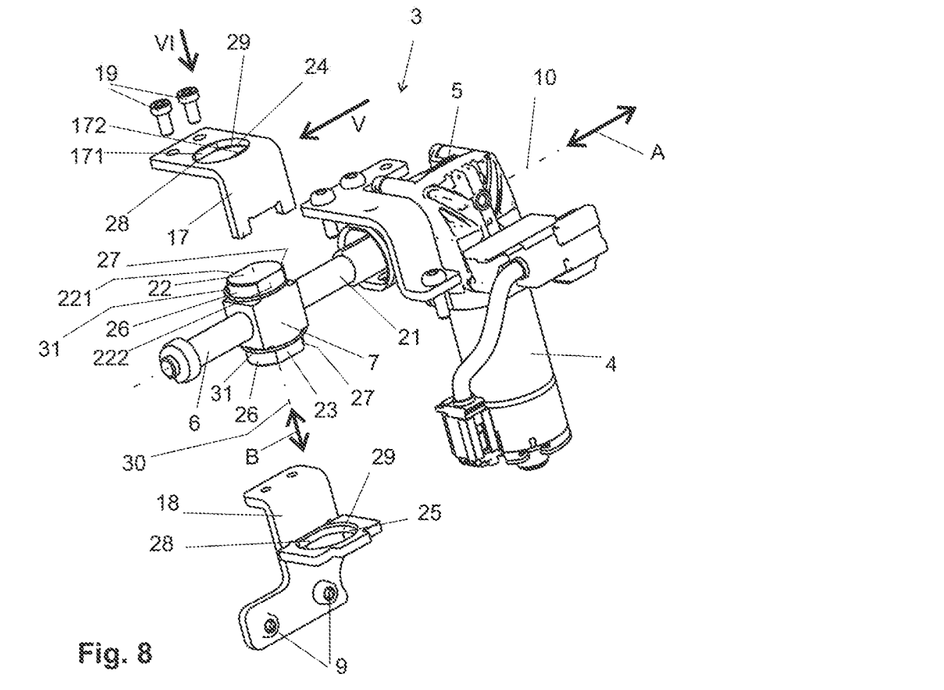
FIG. 8 is a perspective view of a motorized drive according to FIG. 7, having a disassembled connection part corresponding to the example of FIG. 6.

FIGS. 6 to 8 show an illustration such as is applicable to the second to the seventh exemplary embodiment. In addition to the solution provided in the first embodiment, spring elements are additionally provided at different positions in these exemplary embodiments. Accordingly, the illustrations in FIGS. 6 to 8 in a largely identical manner show the same features as in FIGS. 1 to 3 such that only the points of differentiation will be described hereunder in order to avoid repetitions.

The further exemplary embodiments refer in each case to said FIGS. 6 to 8. A plate spring 31 in a representative manner is as a sprung element in FIG. 8, the function of said plate spring 31 being explained further below.

Figure 9:
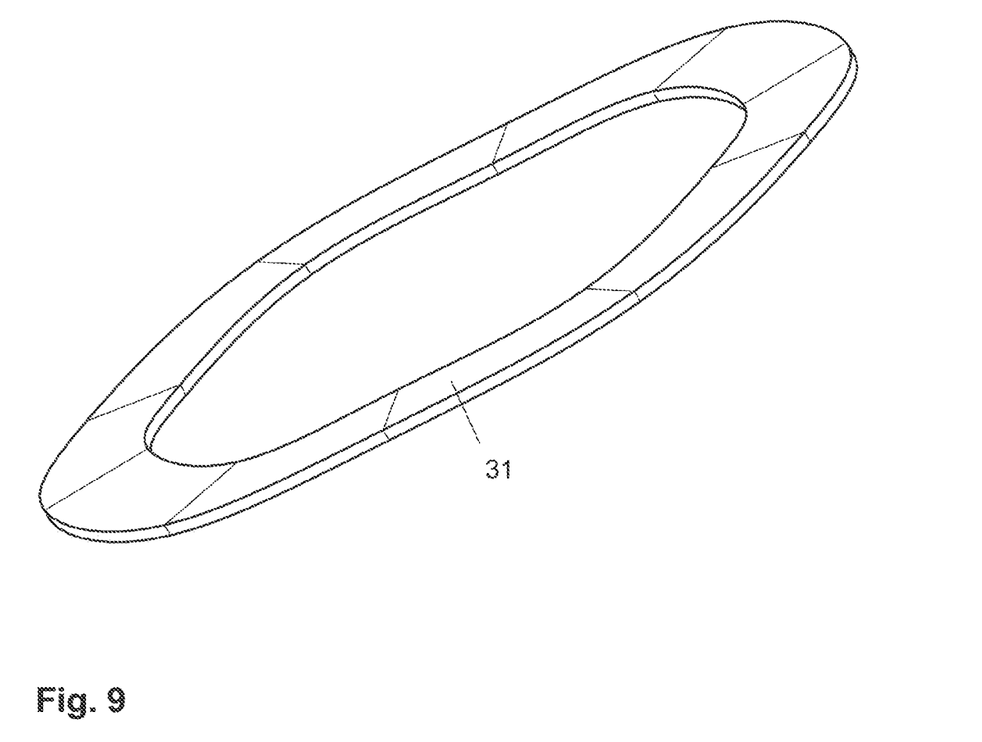
FIG. 9 is a perspective view of a Belleville spring.
Figures 10, 11:
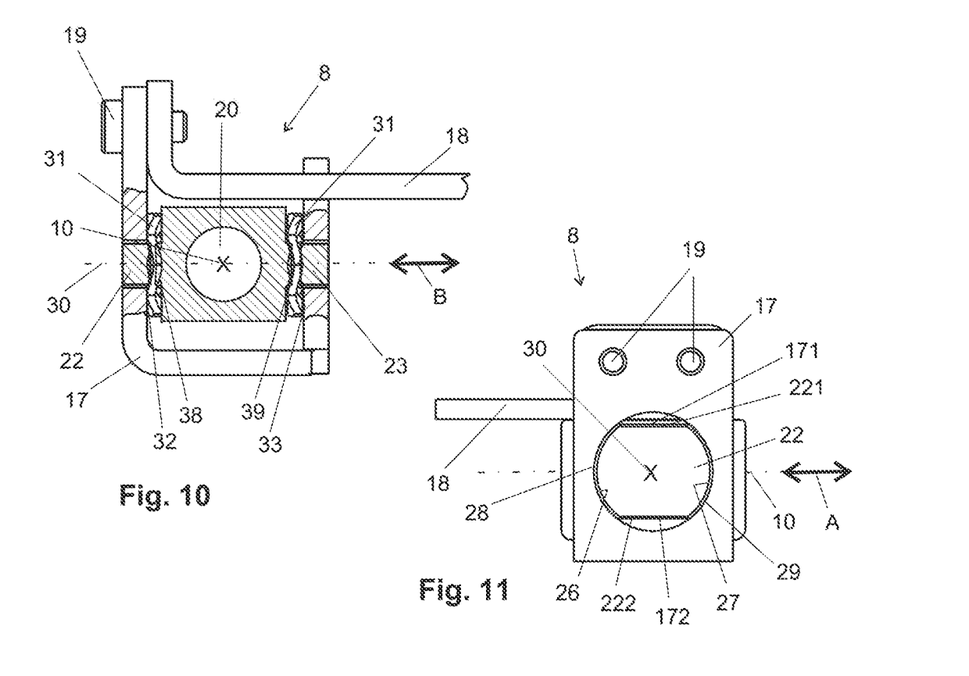
FIG. 10 is a partial sectional plan view from a direction V of FIG. 8 of the example connection part, having an adjustment nut that is mounted so as to be tiltable in said connection part.
FIG. 11 is a plan view from a direction VI of FIG. 3 of the connection element of FIG. 10.

The second exemplary embodiment is visualized in FIGS. 9 to 11.

In a manner corresponding to the second embodiment, Belleville springs 31 are provided as damping and centering elements. A Belleville spring 31 can be seen in FIG. 9. In the present invention, such Belleville springs 31 are used for centering the adjustment nut 7 in the guides thereof in the connection part 8. The Belleville springs 31 also serve for avoiding rattling noises which can arise as a result of vibrations which are generated in the operation of the motor vehicle while driving. The Belleville springs 31 are designed so as to be annular and slightly corrugated. Said Belleville springs are therefore suitable for compressing under forces which are orthogonal to a plane defined by the annular face of the Belleville springs 31. It is conceivable and possible herein for Belleville springs 31 coated with plastics material or an elastomer to be used for reducing the generation of noise.

As can best be seen in FIG. 10, the adjustment nut 7 is guided with clearance between opposite inner guiding faces 32, 33 of the connection part 8 such that said adjustment nut 7 within the guiding faces 32, 33 is displaceable in a plane orthogonal to the axial direction A.

FIGS. 10 and 11 show a second exemplary embodiment in which the adjustment nut 7 in a first displacement direction B orthogonal to the axial direction A is displaceable between a first inner guiding face 32 and a second inner guiding face 33, opposite the latter, of the connection part 8. A spring element in the form of a Belleville spring 31 herein is in each case disposed between the first inner guiding face 32 of the connection part 8 and a first outer surface 38, neighboring the latter, of the adjustment part 7, as well as between the second inner guiding face 33 of the connection part 8 and a second outer surface 39, neighboring the latter, of the adjustment nut 7. This construction enables a sprung movement of the adjustment nut 7 in the displacement direction B along the axis 30. The guiding in the other dimensions is represented by the mounting of the protrusions 22 and 23 in the recesses 24 and 25.

Figures 12, 13, 14, 15:
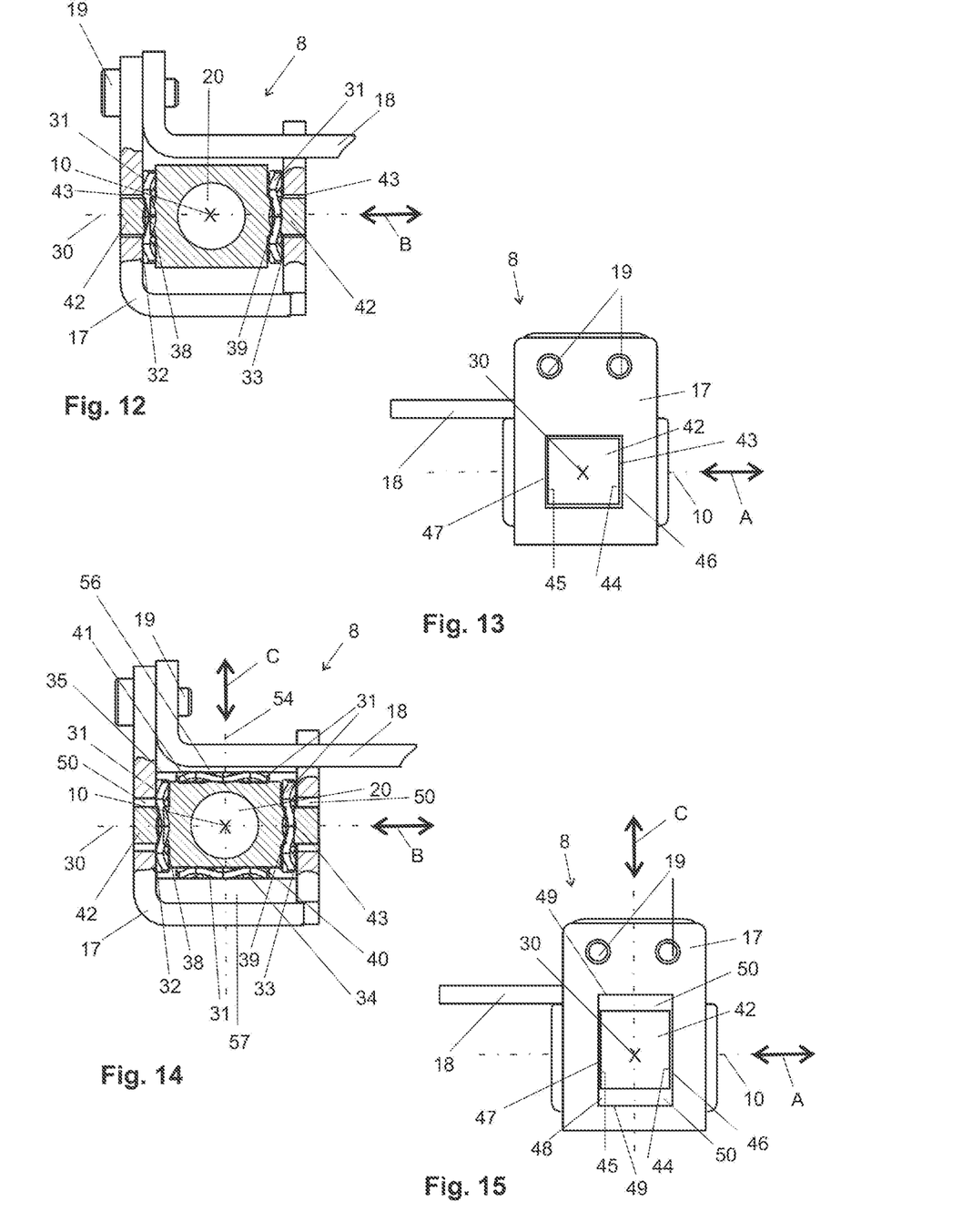
FIG. 12 is a partial sectional plan view from a direction V of FIG. 8, in a view analogous to that of FIG. 10, of a connection part in still another example in which the adjustment nut is mounted so as to be displaceable in a first displacement direction B.
FIG. 13 is a plan view of the connection part in the example of FIG. 12 from the direction VI of FIG. 8.
FIG. 14 is a partial sectional plan view from the direction V of FIG. 8, in a view analogous to that of FIG. 10, of a connection part in yet another example in which an adjustment nut is mounted so as to be displaceable in a first displacement direction B as well as in a second displacement direction C.
FIG. 15 is a plan view of the connection part of FIG. 14 analogous to that of FIG. 11.

In the third exemplary embodiment shown in FIGS. 12 and 13, the protrusions 42 are not configured so as to be circular-cylindrical or partially circular-cylindrical but rectangular, in particular square, in the cross section. The view according to FIG. 12 herein is not fundamentally different from the view of FIG. 10. In terms of the displacement capability in the first displacement direction B, the second exemplary embodiment has an identical function which is therefore omitted in order to avoid repetitions. The recesses 43 associated with the protrusions 42 in the sheet-metal part 17 of the connection part 8 are also square in the cross section. The protrusion 42 is received with clearance in the recess 43. The protrusion 42 has a forward lateral range 44 which in the axial direction A lies on a forward inner face 46 of the recess 43. A rearward lateral region 45 of the protrusion 40 lies on a rearward inner face 47 of the recess 43. In this way, displacement forces in the axial direction A can be transmitted from the adjustment nut 7 to the connection part 8 and ultimately to the casing unit 2. In addition to the displacement in the first displacement direction B, a displacement in a second displacement direction C which in the example is aligned so as to be orthogonal to the first displacement direction B is provided by way of the fourth exemplary embodiment shown in FIGS. 14 and 15. The displacement in the first displacement direction B is analogous to the first exemplary embodiment described above. The displacement in the second displacement direction C is enabled in that the adjustment nut 7 is disposed with the clearance between a third inner guiding face 34 and a fourth inner guiding face 35, opposite the latter, of the connection part 8 such that said adjustment nut 7 is displaceable in a second displacement direction C which is in each case orthogonal to the axial direction A and to the first displacement direction B. An additional component 56 is provided for configuring the fourth inner guiding face 35, and an additional component 57 is provided for configuring the third inner guiding face 34. Said components can be configured as separate components formed from plastics material, for example. However, it is also conceivable and possible for said guiding faces 34, 35 to be directly molded on the sheet-metal part 17 or 18.

A Belleville spring 31 is again in each case disposed between the third inner guiding face 34 of the connection part 8 and a third outer surface 40, neighboring the latter, of the adjustment nut 7 as well as between the fourth inner guiding face 35 of the connection part 8 and a fourth outer surface 41, neighboring the latter, of the adjustment nut 7 in this example. A sprung movement of the adjustment nut 7 in the second displacement direction C in relation to the connection part 8 is enabled on account thereof.

A modified recess 48 is visualized in FIG. 15, the dimensions of said modified recess 48 in the second displacement direction C being larger than in the displacement direction A. There is sufficient clearance space 50 between the protrusion 42 of the adjustment nut 7 and the lateral inner faces 49 of the recess 48 that lie in the second displacement direction C so as to enable the displacement of the adjustment nut 7 in the displacement direction B in relation to the connection part 8. The forward inner face 46, or the rearward inner face 47, respectively, absorbs in each case the longitudinal adjustment forces in the axial direction A that are transmitted from the forward lateral region 44, or the rearward lateral region 45, respectively, of the protrusion 42 of the adjustment nut 7.

The Belleville springs 31 illustrated in the fourth exemplary embodiment can in principle be entirely or partially omitted. The use of elastic or sprung elements is favorable in terms of reducing the generation of noise but is not mandatory, depending on the embodiment.

Figures 16, 17, 18, 19:
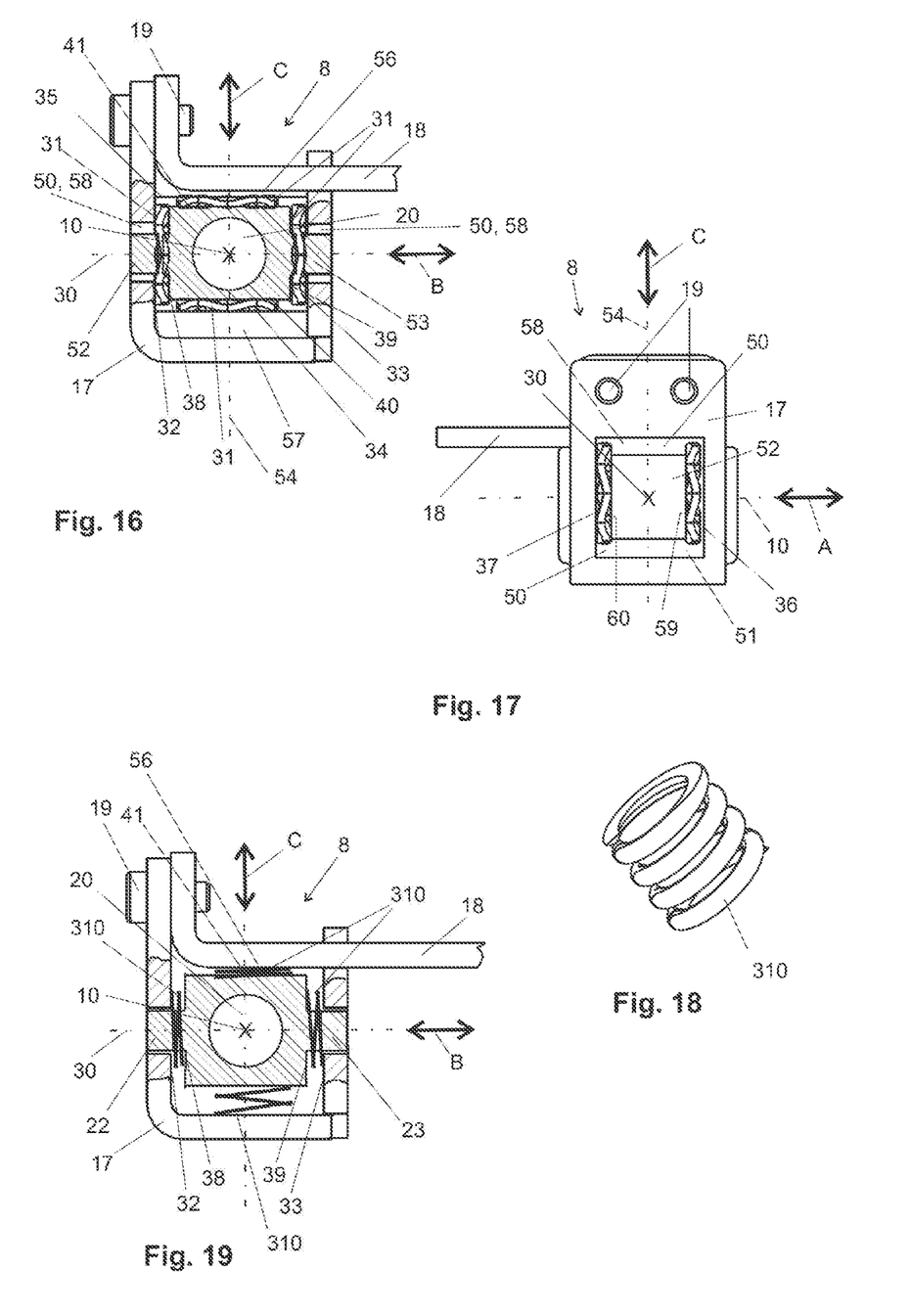
FIG. 16 is a partial sectional view from the direction V of FIG. 8, in a view analogous to that of FIG. 10, of another example connection part in which the adjustment nut, along with the first displacement direction B and the second displacement direction C, is also mounted so as to be displaceable in the axial direction A.
FIG. 17 is a plan view of the connection part of FIG. 16 in VI of FIG. 8, analogous to that of FIG. 11.
FIG. 18 is a perspective view of an example coil spring.
FIG. 19 is a partial sectional view of one more example connection part, analogous to the example in FIG. 10, wherein Belleville springs are replaced by coil springs.

In a fifth exemplary embodiment of the invention, shown in FIGS. 16 and 17, a displacement capability along the axial direction A is provided in addition to the displacement capability of the adjustment nut 7 in the first displacement direction B and the second displacement direction C. The displacement capabilities in the first displacement direction B and the second displacement direction C in this fourth embodiment are implemented as in the third embodiment.

Additionally, the recesses 58 in the sheet-metal parts 17 and 18 for receiving the protrusions 52 and 53 are so large that a clearance space 50 is created in the axial direction 10 and in the axial direction 54 such that a mobility is created in said axial directions. The protrusion 52 of the adjustment nut 7 also has a square cross section in the fourth exemplary embodiment. The clearance spaces 50 for enabling the lateral displacement in the displacement direction B are also unchanged. A recess 51 of the connection part 8 that is yet again modified is presently designed so as to be substantially square. The protrusion 42 of the adjustment nut 7 is disposed so as to be displaceable in the axial direction A between a fifth inner guiding face 36 and a sixth inner guiding face 37, opposite the latter, of the connection part 8, wherein at least one spring element 31 is in each case disposed between the fifth inner guiding face 36 of the connection part 8 and a fifth outer surface 59, neighboring the latter, of the adjustment nut 7 as well as between the sixth inner guiding face 37 of the connection part 8 and a sixth outer surface 60, neighboring the latter, of the adjustment nut 7. On account thereof, the connection part 8 on the adjustment nut 7 is connected to the adjustment nut 7 so as to be elastic in all three dimensions corresponding to the axial direction A and the two displacement directions B and C. The additional elastic connection in the axial direction A between the adjustment nut 7 and the connection part 8 has the advantage that the adjustment nut 7 in the tough everyday operation of the motor vehicle can avoid excess stress in relation to the threaded spindle 6 not only by yielding in the displacement direction B or in the displacement direction C but also by tilting. The adjustment nut 7 herein can be tilted not only about the rotation axis 30 which is disposed so as to be parallel to the displacement direction B, but also about a rotation axis 54 which is disposed so as to be parallel to the displacement direction C, or about any other arbitrary rotation axis.

Of course, not only the Belleville spring 31 illustrated in FIG. 4 can be used as the spring element 31, but all other suitable forms of spring elements are possible, in particular plate springs, a helical spring, or leaf springs. Furthermore, the springs mentioned may also be replaced by spring elements from an elastomeric material or rubber. It is also conceivable for spring elements coated with an elastomer or rubber or plastics material to be used.

A plurality of degrees of freedom for displacing or tilting the adjustment nut 7 which are not possible in the prior art are accessed on account of the invention. Canting or jamming of the adjustment nut 7 on the threaded spindle 6 which would otherwise lead to increased friction, higher adjustment forces, heavier wear, or even blocking of the longitudinal adjustment drive of the steering column, can advantageously be avoided. The measures according to the invention herein are to be carried out in such a simple manner that the production complexity associated therewith and the production costs remain low.

In all the exemplary embodiments mentioned above the spring elements or elastic elements mentioned as an example in the form of Belleville springs 31 can be replaced by other elastic elements such as plate springs 320, by helical springs 310, or even by the elastic properties of the contacting sheet-metal parts or by the elasticity of the adjustment nut 7. The various possibilities are visualized in FIGS. 18 to 20 while using the example of the embodiment as per FIG. 16.

In the sixth exemplary embodiment corresponding to FIGS. 18 and 19, helical springs 310 are inserted as the sprung element.

Figure 20:
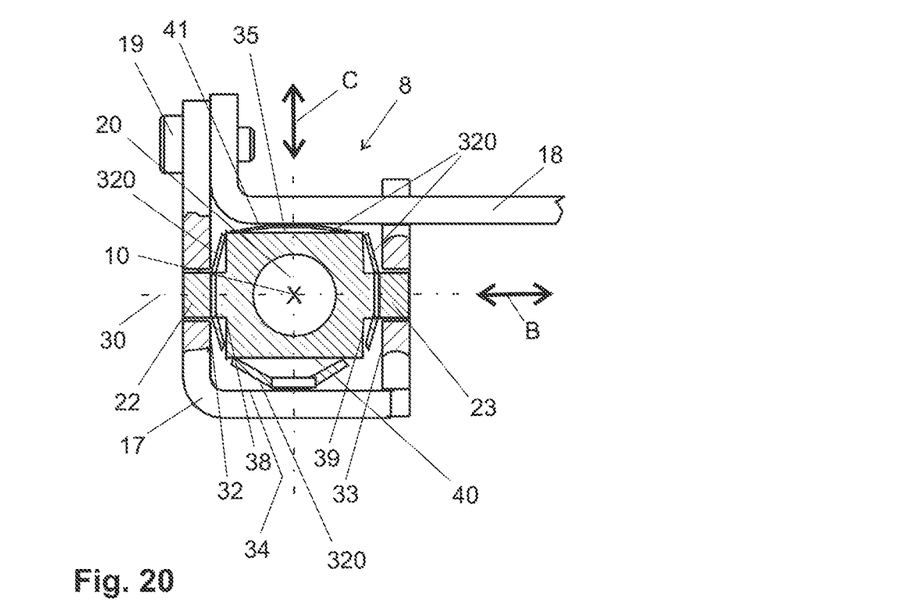
FIG. 20 is a partial sectional view of yet another alternative connection part, analogous to the example in FIG. 10, wherein Belleville springs are replaced by plate springs.

In the seventh exemplary embodiment corresponding to FIG. 20, plate springs 320 are inserted as the sprung element.

Figure 21:
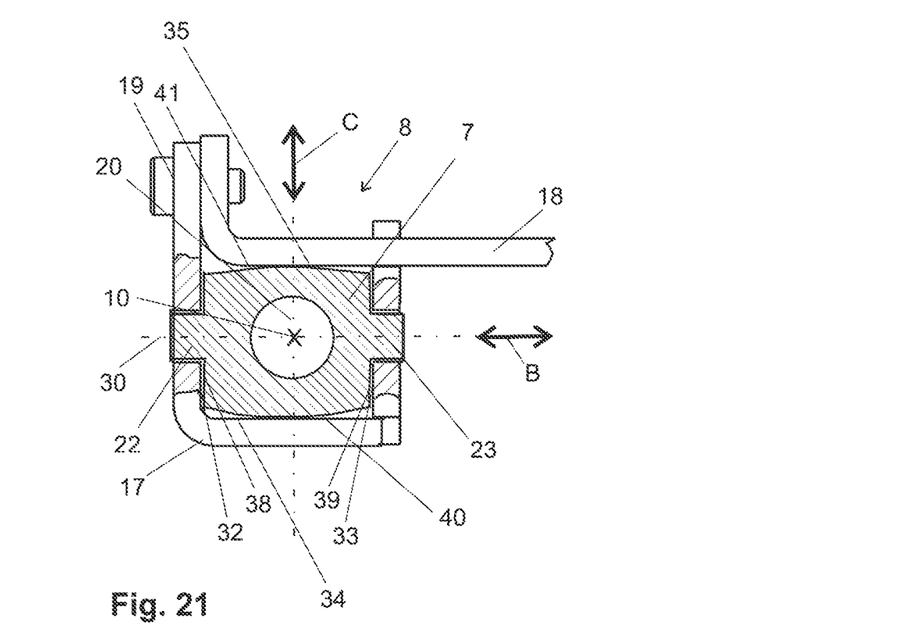
FIG. 21 is a partial sectional view of still a further example connection part, analogous to the example in FIG. 10, wherein the function of the elasticity by way of Belleville springs is replaced by the elasticity of sheet-metal parts.

It is visualized in the eighth exemplary embodiment corresponding to FIG. 21 how the elasticity of the sheet-metal parts 17 and 18 alone enables and damps the axial displacement capability of the spindle nut 7 in relation to the connection part 8.

The installed situation of the spindle nut 7 in the connection part is illustrated in the exemplary embodiments.

It is conceivable and possible for the adjustment nut 15 to also be disposed in an analogous manner in the second connection part 151. All embodiments mentioned above can be applied in analogous manner to the height adjustment.

It is conceivable and possible for the various illustrations of the elastic elements to be combined.

What is claimed is:

1. An adjustable steering column for a motor vehicle, the adjustable steering column comprising:
    a casing unit for rotatably mounting a spindle part of a steering spindle, the casing unit being mounted so as to be axially slidable and/or pivotable relative to a holding installation,
    a motorized drive by way of which the casing unit is adjustable axially and/or in a pivoting direction, wherein the motorized drive includes an electric motor that is fastened to the holding installation and that drives a threaded spindle aligned axially along an axial direction and mounted on the holding installation so as to be rotatable and axially non-displaceable; and
    an adjustment nut in which the threaded spindle engages, the adjustment nut being connected to the casing unit, wherein the adjustment nut and the casing unit are displaceable axially relative to the holding installation, wherein the adjustment nut is configured to transmit axial forces from the adjustment nut to the casing unit and is mounted in a connection part fastened to the casing unit, wherein the adjustment nut is guided with clearance between opposite inner guiding faces of the connection part such that the adjustment nut within the opposite inner guiding faces is displaceable in a plane orthogonal to the axial direction.

2. The adjustable steering column of claim 1 wherein the adjustment nut, in a first displacement direction orthogonal to the axial direction, is displaceable between a first inner guiding face of the opposite inner guiding faces and a second inner guiding face of the opposite inner guiding faces that opposes the first inner guiding face of the connection part.

3. The adjustable steering column of claim 2 wherein a first spring element is disposed between the first inner guiding face and a neighboring first outer surface of the adjustment nut, wherein a second spring element is disposed between the second inner guiding face and a neighboring second outer surface of the adjustment nut.

4. The adjustable steering column of claim 3 wherein the first and second spring elements are configured as Belleville springs.

5. The adjustable steering column of claim 3 wherein the first and second spring elements are comprised of an elastomer.

6. The adjustable steering column of claim 3 wherein the adjustment nut, in a second displacement direction orthogonal to the axial direction and to the first displacement direction, is displaceable between a third inner guiding face of the opposite inner guiding faces and a fourth inner guiding face of the opposite inner guiding faces that opposes the third inner guiding face of the connection part.

7. The adjustable steering column of claim 1 wherein the adjustment nut is mounted on the connection part so as to be rotatable about an axis orthogonal to the axial direction.

8. The adjustable steering column of claim 1 wherein the adjustment nut is mounted in the connection part so as to be rotatable about a displacement direction that is perpendicular to the axial direction.

9. An adjustable steering column for a motor vehicle, the adjustable steering column comprising:
    a casing unit for rotatably mounting a spindle part of a steering spindle, the casing unit being mounted so as to be axially slidable and/or pivotable relative to a holding installation,
    a motorized drive by way of which the casing unit is adjustable axially and/or in a pivoting direction, wherein the motorized drive includes an electric motor that is fastened to the holding installation and that drives a threaded spindle aligned axially along an axial direction and mounted on the holding installation so as to be rotatable and axially non-displaceable; and
    an adjustment nut in which the threaded spindle engages, the adjustment nut being connected to the casing unit, wherein the adjustment nut and the casing unit are displaceable axially relative to the holding installation, wherein the adjustment nut is configured to transmit axial forces from the adjustment nut to the casing unit and is mounted in a connection part fastened to the casing unit, wherein the adjustment nut is guided with clearance between opposite inner guiding faces of the connection part such that the adjustment nut within the opposite inner guiding faces is displaceable in a plane orthogonal to the axial direction,
    wherein the adjustment nut, in a first displacement direction orthogonal to the axial direction, is displaceable between a first inner guiding face of the opposite inner guiding faces and a second inner guiding face of the opposite inner guiding faces that opposes the first inner guiding face of the connection part, wherein a first spring element is disposed between the first inner guiding face and a neighboring first outer surface of the adjustment nut, wherein a second spring element is disposed between the second inner guiding face and a neighboring second outer surface of the adjustment nut, wherein the adjustment nut, in a second displacement direction orthogonal to the axial direction and to the first displacement direction, is displaceable between a third inner guiding face of the opposite inner guiding faces and a fourth inner guiding face of the opposite inner guiding faces that opposes the third inner guiding face of the connection part, wherein a third spring element is disposed between the third inner guiding face and a neighboring third outer surface of the adjustment nut, wherein a fourth spring element is disposed between the fourth inner guiding face and a neighboring fourth outer surface of the adjustment nut.

10. The adjustable steering column of claim 9 wherein the adjustment nut, in the axial direction, is disposed so as to be displaceable between a fifth inner guiding face of the opposite inner guiding faces and a sixth inner guiding face of the opposite inner guiding faces that is opposite the sixth inner guiding face of the connection part, wherein a fifth spring element is disposed between the fifth inner guiding face and a neighboring fifth outer surface of the adjustment nut, wherein a sixth spring element is disposed between the sixth inner guiding face and a neighboring sixth outer surface of the adjustment nut.

* * * * *